United States Patent [19]
Titulaer et al.

[11] Patent Number: 6,128,177
[45] Date of Patent: Oct. 3, 2000

[54] MULTILAYER CAPACITOR

[75] Inventors: Hermanus G. M. Titulaer; Henricus H. M. Wagemans, both of Roermond, Netherlands

[73] Assignee: U.S. Philips Corporation, New York, N.Y.

[21] Appl. No.: 08/982,797

[22] Filed: Dec. 2, 1997

[30] Foreign Application Priority Data

Dec. 6, 1996 [EP] European Pat. Off. .............. 96203453

[51] Int. Cl.$^7$ ............................ H01G 4/008; H01G 4/06
[52] U.S. Cl. ................. 361/305; 361/301.4; 361/321.4; 361/312
[58] Field of Search ................................. 361/303, 305, 361/311, 312, 313, 320, 321.1, 321.2, 321.3, 321.4, 321.5

[56] References Cited

U.S. PATENT DOCUMENTS

| | | | |
|---|---|---|---|
| 3,763,409 | 10/1973 | Sheard | 317/258 |
| 3,798,516 | 3/1974 | Short | 317/258 |
| 4,241,378 | 12/1980 | Dorrian | 361/305 |
| 4,882,651 | 11/1989 | Maher | 361/321 |
| 4,964,923 | 10/1990 | Takeuchi et al. | 148/276 |
| 5,126,318 | 6/1992 | Gavaler et al. | 505/1 |
| 5,556,818 | 9/1996 | Kohler et al. | 501/138 |
| 5,668,694 | 9/1997 | Sato et al. | 361/321.4 |

*Primary Examiner*—Kristine Kincaid
*Assistant Examiner*—Eric W. Thomas
*Attorney, Agent, or Firm*—Norman N. Spain

[57] ABSTRACT

A capacitor comprises a number of ceramic layers on the basis of barium titanate as well as a number of electrode layers of palladium or a silver-palladium alloy, the ceramic layers and the electrode layers being alternately stacked to form a multilayer, which is also provided with two external electric connections which are in contact with a number of said electrode layers. In accordance with the invention, the electrode layers contain copper oxide, preferably 0.5–15 wt. %, calculated with respect to the overall quantity of palladium, silver and copper oxide. It has been found that the presence of a relatively small, yet effective quantity of copper oxide in the electrode material of Pd or Pd—Ag leads to a considerable increase of the internal mechanical strength and of the service life of CMCs. By employing the method in accordance with the invention, the percentage of rejects in the production of the capacitors can be reduced considerably.

4 Claims, 1 Drawing Sheet

MULTILAYER CAPACITOR

BACKGROUND OF THE INVENTION

The invention relates to a ceramic multilayer capacitor comprising a number of ceramic layers on the basis of barium titanate as well as a number of electrode layers of palladium or a silver-palladium alloy, the ceramic layers and the electrode layers being alternately stacked to form a multilayer, which is also provided with two external electric connections which are in contact with a number of said electrode layers. The invention also relates to a method of manufacturing this ceramic multilayer capacitor.

It is noted that the expression "on the basis of barium titanate" is to be understood to include, apart from pure barium titanate, materials in which the barium content is partly replaced by calcium, strontium or lead and/or by rare earth elements such as gadolinium and/or neodymium, and in which the titanium content is partly replaced by zirconium. In addition, the barium sites and the titanium sites of the material may be substituted with further suitable donor ions and/or acceptor ions, such as Mn, Bi, Nb etc. Such substitutions of barium and/or titanium are important to provide the ceramic material with properties which are necessary for the intended field of application of the capacitors.

Ceramic multilayer capacitors (CMCs) of the type mentioned in the opening paragraph as well as methods of manufacturing said capacitors are known, for example, from U.S. Pat. No. 4,882,651. In said Patent Specification, a description is given, more particularly, of a CMC which is provided with cover layers of a ceramic material. The chemical composition of the cover layers is identical to that of the ceramic layers situated between the electrode layers. In the known capacitors, use is made of cover layers whose grain size is larger than that of the ceramic layers.

It has been found that the known CMCs have an important drawback. Particularly in the case of capacitors comprising a large number of electrode layers (20 or more), the internal mechanical strength leaves much to be desired. Under specific conditions, this may cause delamination in the capacitor, leading to cracks between the electrode layers and the ceramic layers. This adverse effect takes place, in particular, if these capacitors are subjected to a thermal treatment. Such a thermal treatment occurs, for example, during soldering of the capacitors.

It is an object of the invention to reduce the above-mentioned drawback. The invention more particularly aims at providing a CMC in which said delamination is reduced so that the internal mechanical strength is increased. The CMC in accordance with the invention should also exhibit a long service life. The invention additionally aims at providing a method of manufacturing CMCs having a higher internal mechanical strength and a long service life.

SUMMARY OF THE INVENTION

These and other objects of the invention are achieved by a CMC, which is characterized in that the electrode layers comprise copper oxide.

It has been found that the presence of a relatively small, yet effective quantity of copper oxide in the electrode material of Pd or of Pd—Ag leads to a considerable increase of the internal mechanical strength as well as of the service life of the CMC in accordance with the invention. The working principle of the invention is not exactly known. Tests have shown that by employing the invention, the number of rejects in the production of capacitors can be reduced by a factor of 10 while the service life of the capacitors is increased considerably.

A preferred embodiment of the CMC in accordance with the invention is characterized in that the quantity of copper oxide in the palladium or the silver-palladium alloy of the electrode layers ranges from 0.5 to 15 wt. %, calculated with respect to the overall quantity of palladium, silver and copper oxide. If the quantity of copper oxide used is below 0.5 wt. %, the effect of the invention occurs to an insufficient degree. The use of a quantity of copper oxide in excess of 15 wt. % leads to a substantial reduction of the electric conductivity of the electrode layers. A good compromise between both adverse effects is achieved if the above-mentioned copper-oxide content ranges between 1 and 10 wt. %. Optimum results as regards service life and mechanical strength are achieved if the copper-oxide content ranges between 4 and 6 wt. %.

Another interesting embodiment of the ceramic multilayer capacitor is characterized in that the thickness of the electrode layers ranges between 0.7 micron and 2.0 microns. If the layer thickness is below 0.7 micron, the electric conductivity of the electrode layers is insufficient. If the layer thickness exceeds 2.0 microns, the capacitance per unit of volume of the capacitor becomes too small. An optimum compromise between both disadvantages is achieved if the layer thickness of capacitors in accordance with the invention is approximately 1.0 micron.

Satisfactory results are attained by means of an embodiment of the capacitor in accordance with the invention, which is characterized in that the composition of the main phase of the material of the ceramic layers corresponds to the formula $[Ba_{0.25}Sr_{0.02}Ca_{0.05}Nd_{0.30}Gd_{0.20}X_{0.18}][Ti_{1.000}]O_3$, wherein X indicates the number of vacancies in the Ba sites. Experiments have shown that capacitors comprising this type of ceramic layers exhibit a long service life and a low degree of crack formation.

The invention also relates to a method of manufacturing a ceramic multilayer capacitor, which method comprises the following steps:

screen-printing of electrode layers on a ceramic foil using a palladium or a silver-palladium paste,
stacking a number of these foils to form a multilayer,
compressing the multilayer,
subdividing the multilayer into individual multilayer elements,
calcining and sintering of the multilayer elements,
providing electric connections at one or more side faces of the multilayer elements.

This method is characterized in accordance with the invention in that the palladium paste or the silver-palladium paste contains copper oxide, and sintering is carried out at a maximum temperature in the range between 1180 and 1220° C. Multilayer capacitors manufactured in accordance with the inventive method are substantially less subject to crack formation and exhibit a relatively long service life.

An interesting embodiment of the method in accordance with the invention is characterized in that the palladium paste or the silver-palladium paste contains a quantity of copper oxide in the range from 0.5 to 15 wt. %, calculated with respect to the overall quantity of palladium, silver and copper oxide. Preferably, said quantity of copper oxide ranges between 1 and 10 wt. %, and more preferably between 4 and 6 wt. %. The thickness of the electrode layers manufactured by means of said silver-palladium paste preferably ranges between 0.7 micron and 2.0 microns.

These and other aspects of the invention will be apparent from and elucidated with reference to the embodiments described hereinafter.

The invention will now be described in greater detail with reference to the figures of the drawings which for clarity were not drawn to scale.

DETAILED DESCRIPTION OF THE INVENTION

Figure 1:
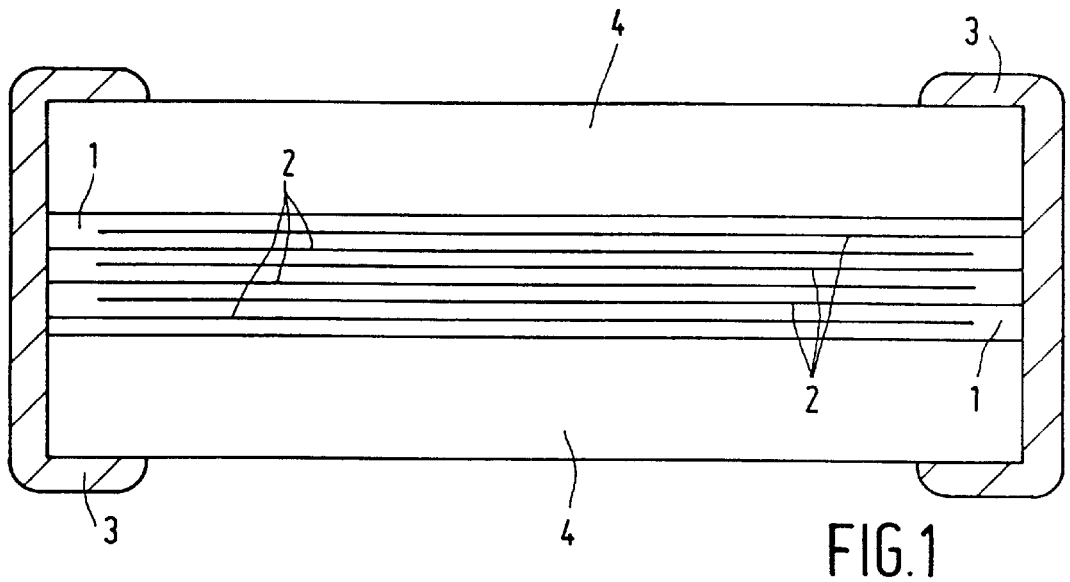
FIG. 1 is a schematic, sectional view of a multilayer capacitor in accordance with the invention, FIG. 2 graphically shows the results of accelerated life tests to which (a) capacitors in accordance with the invention and (b) capacitors not in accordance with the invention are subjected.

FIG. 1 shows a multilayer capacitor in accordance with the invention. This multilayer capacitor comprises a number of ceramic layers 1 on the basis of doped barium titanate ($BaTiO_3$). The exact composition is $[Ba_{0.25}Sr_{0.02}Ca_{0.05}Nd_{0.30}Gd_{0.20}X_{0.18}][Ti_{1.000}]O_3$. This capacitor additionally comprises a number of electrode layers 2 which predominantly comprise Ag—Pd with 5 wt. % copper oxide, calculated with respect to the overall quantity of palladium, silver and copper oxide. The capacitor also comprises two electric connections 3 which are provided on two opposite side faces of the capacitor. These connections contain a solderable material, for example copper. In practice, the electrode layers are provided on a ceramic foil by means of screen printing, whereafter a number of said printed foils are stacked. As shown in FIG. 1, the ceramic foils are stacked in such a manner that successive electrode layers are alternately connected to one of the two electric connections.

For clarity, only 6 electrode layers are shown in FIG. 1. In practice, ceramic multilayer capacitors demonstrating the effect of the invention comprise at least twenty, and preferably at least hundred, electrode layers. The thickness of said electrode layers typically ranges from approximately 0.7 to 2.0 micrometers. The ceramic foils have a typical thickness in the range from 5 to 20 micrometers. In practice, the capacitors are provided with a protective layer 4 on the upper side and the lower side of the stacked, printed foils. Said protective layer generally consists of a number of unprinted ceramic foils which are stacked together with the printed ceramic foils.

The ceramic multilayer capacitors in accordance with the invention are manufactured as follows. First, a powder mixture is prepared by mixing powders of oxides and/or carbonates of the desired metals in quantities corresponding to the intended composition. This powder mixture is suspended in an aqueous solution to which a small quantity of a dispersing agent is added. The suspension is ground for several hours in a continuous attrition mill, so that the average particle size of the powder particles is reduced to below 0.4 micrometer. Subsequently, the powder is dried.

Next, the dried powder is calcined in air for several hours at approximately 1100° C. In this process, the desired, doped $BaTiO_3$ is formed. Subsequently, this $BaTiO_3$ is ground for several hours. The resultant powder has an average particle size below 1.0 micrometer. A binder solution is added to this powder. Next, green ceramic foils having a thickness, for example, of 40 micrometers are drawn from the powder/binder mixture. By means of a technique which is known per se, a large number of electrode layers are screen-printed onto these foils. For this purpose, use is made of a screen-printing paste comprising approximately 40 wt. % of a binder solution (solvents and polymers) and approximately 60 wt. % of a solid material. Said solid material contains approximately 15 wt. % of a ceramic powder whose composition corresponds to that of the ceramic layers. The solid material contains approximately 85 wt. % of a finely dispersed powder comprising palladium (70–90 wt. %, preferably 80 wt. %), silver (10–20 wt. %, preferably 15 wt. %) and copper oxide (1–10 wt. %, preferably 4–6 wt. %). The layer thickness of the unsintered electrode layers is approximately 1.4 microns.

Subsequently, a number of the foils on which electrode layers have been printed and which have desired dimensions are stacked. The stacking process is carried out in such a manner that the electrode layers of the even layers and the electrode layers of the odd layers are slightly displaced relative to each other. The stacked foils are uniaxially compressed under a high pressure (approximately 300 bar) and at an elevated temperature (approximately 80° C.) to form a multilayer structure. This structure is subsequently broken in one direction to form rods and in a second direction (at right angles to the first direction) to form individual multilayer capacitor elements. These elements are, in succession, calcined and sintered (maximum temperature 1180–1220° C.) in air.

Finally, the multilayer capacitor elements are provided, on two facing surfaces, with electric connections of copper by means of immersion copperplating. These connections are galvanically reinforced and provided with a solderable NiSn alloy. Subsequently, the mechanical and electrical properties of the resultant ceramic multilayer capacitors can be measured.

By means of the method described hereinbefore, a first number of ceramic multilayer capacitors (b series) was manufactured on the basis of the above-mentioned doped $BaTiO_3$. The Ag—Pd screen-printing paste used in said b-series did not contain copper oxide. In addition, a second number of ceramic multilayer capacitors (a-series) was manufactured. The screen-printing paste used for said second series contained approximately 5 wt. % copper oxide, calculated with respect to the overall quantity of Ag, Pd and copper oxide. Both series were tested for mechanical strength and service life.

Visual inspection (light microscopy) of slices of both series revealed that the capacitors of the a-series exhibited considerably fewer cracks than the capacitors of the b-series after they had been exposed to a thermal treatment (for 10 seconds at 330° C.). The percentage of rejects as a result of cracks was 30% lower in the a-series than in the b-series.

Figure 2:
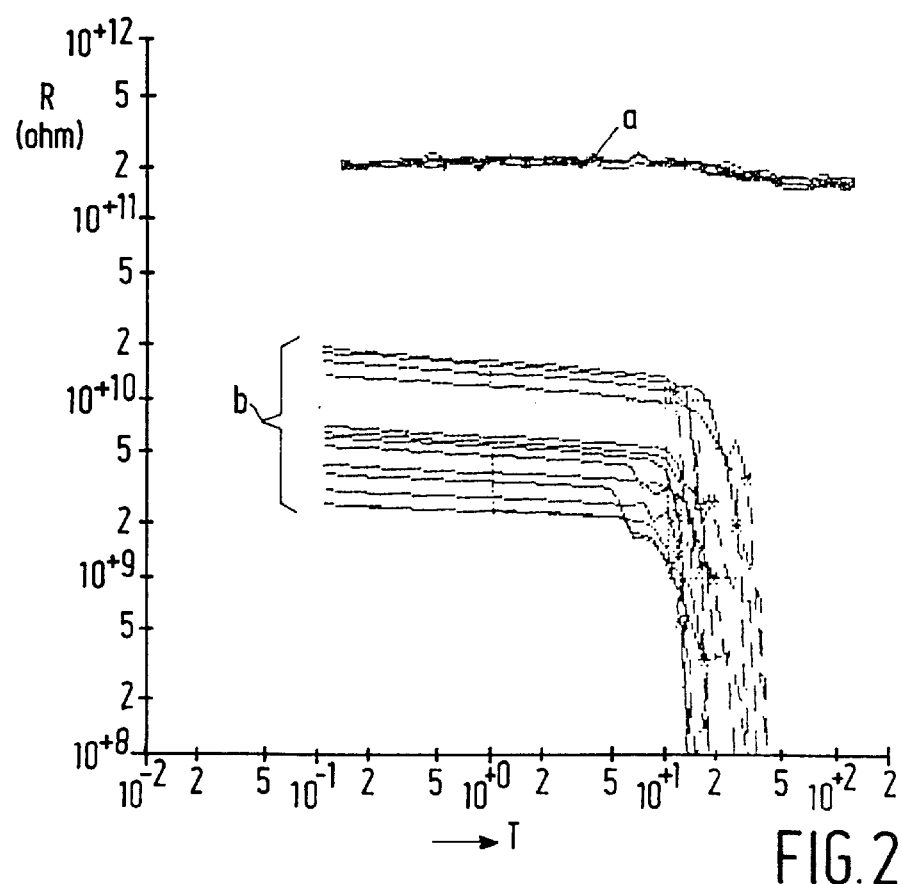

The graph shown in FIG. 2 shows the results of accelerated life tests (140° C., 400 V, DC) for maximally 100 hours. In the graph, the resistance R (ohm) is plotted as a function of time T (hours), the time scale exhibiting a logarithmic variation. FIG. 2 shows that the inventive capacitors of the a-series have a much longer service life than the capacitors of the b-series. Besides, it has been found that the reproducibility of the resistance value of the capacitors of the a-series is also much higher than that of the capacitors of the b-series.

The above description shows that the presence of a relatively small, yet effective quantity of copper oxide in the electrode material Pd or of of Pd—Ag leads to a considerable increase of the internal mechanical strength and of the service life of CMCs. By employing the present invention, the number of rejects in the manufacture of capacitors can be reduced considerably.

What is claimed is:

1. A ceramic multilayer capacitor comprising a number of ceramic layers comprising barium titanate as well as a number of electrode layers of palladium or of a silver-palladium alloy, the ceramic layers and the electrode layers being alternately stacked to form a multilayer, said multilayer also being provided with two external electric connections in contact with a number of said electrode layers, characterized in that the electrode layers comprise copper oxide in an amount of from 0.5–15 wt. % based on the total weight of the palladium and the copper oxide or of the silver-palladium alloy and the copper oxide wherein the electrode layers have a thickness of 0.7 microns to 2.0 microns.

2. The capacitor of claim 1 wherein the electrode layers comprise copper oxide in amount of from 1–10 wt. % based on the total amount of palladium and copper oxide or of silver-palladium alloy and copper oxide.

3. A ceramic multilayer capacitor as claimed in claim 2, wherein the ceramic layers consist essentially of a material which corresponds to the formula $[Ba_{0.25}Sr_{0.02}Ca_{0.05}Nd_{0.30}Gd_{0.20}X_{0.18}][Ti_{1.000}]O_3$, wherein X indicates the number of vacancies in the Ba sites.

4. A ceramic multilayer capacitor as claimed in claim 1 wherein the ceramic layers consist essentially of a material which corresponds to the formula $[Ba_{0.25}Sr_{0.02}Ca_{0.05}Nd_{0.30}Gd_{0.20}X_{0.18}][Ti_{1.000}]O_3$, wherein X indicates the number of vacancies in the Ba sites.

* * * * *